Figure 1:
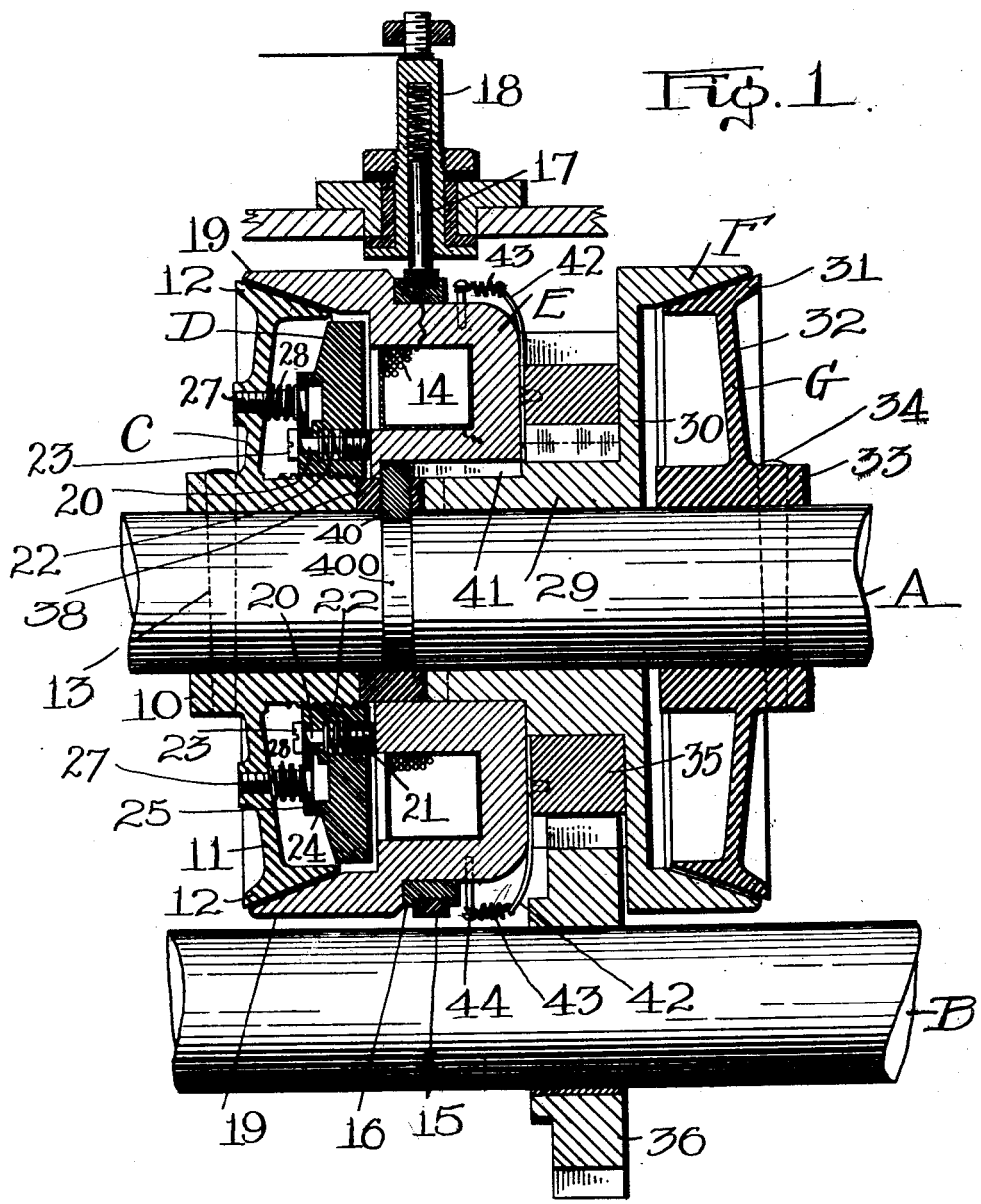

A. W. WHITCOMB.
DOUBLE ACTING CLUTCH.
APPLICATION FILED JULY 24, 1911.

1,056,243.

Patented Mar. 18, 1913.
2 SHEETS—SHEET 1.

Witnesses:
C. F. Mason
E. M. Allen

Inventor:
A. W. Whitcomb
by Attorneys
Southgate & Southgate

A. W. WHITCOMB.
DOUBLE ACTING CLUTCH.
APPLICATION FILED JULY 24, 1911.
1,056,243.
Patented Mar. 18, 1913.
2 SHEETS—SHEET 2.
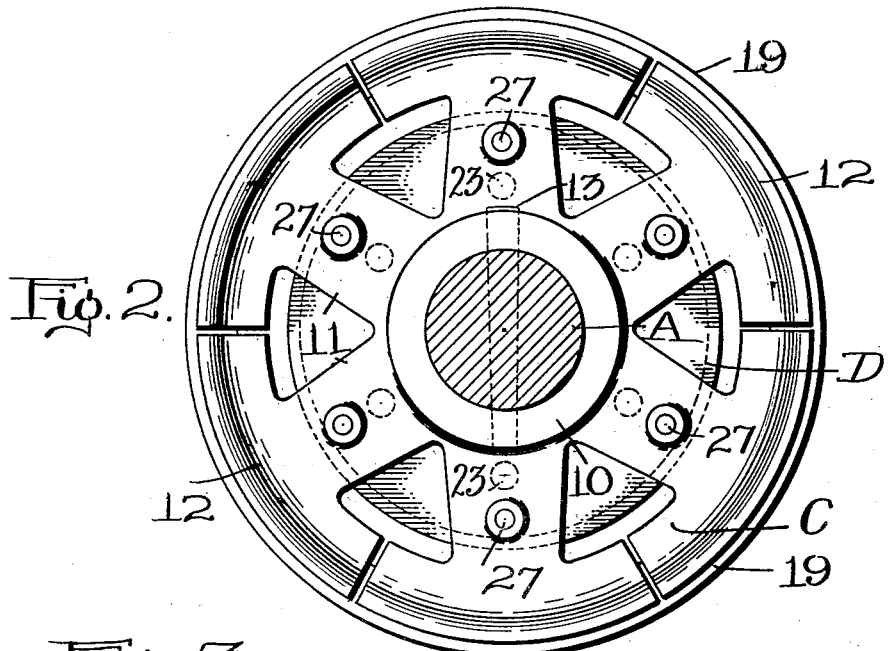
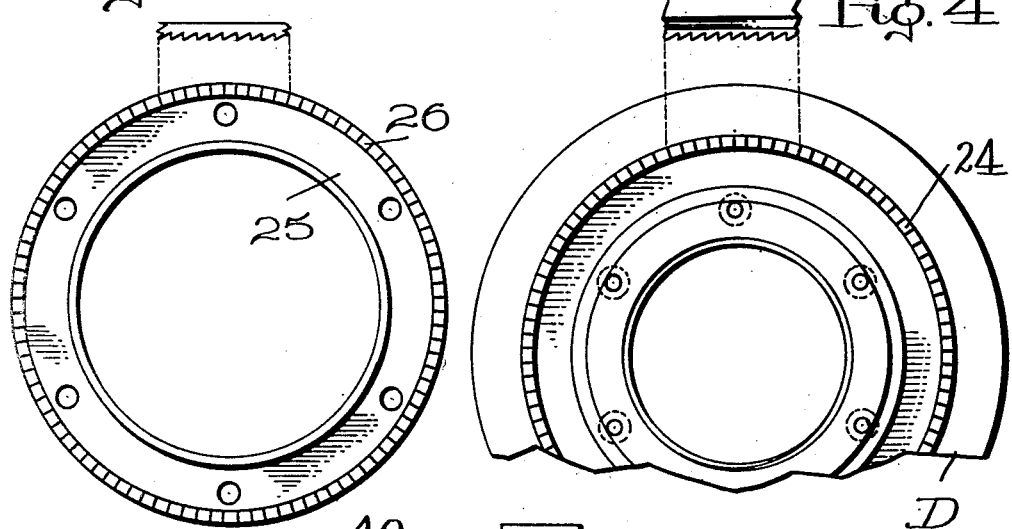
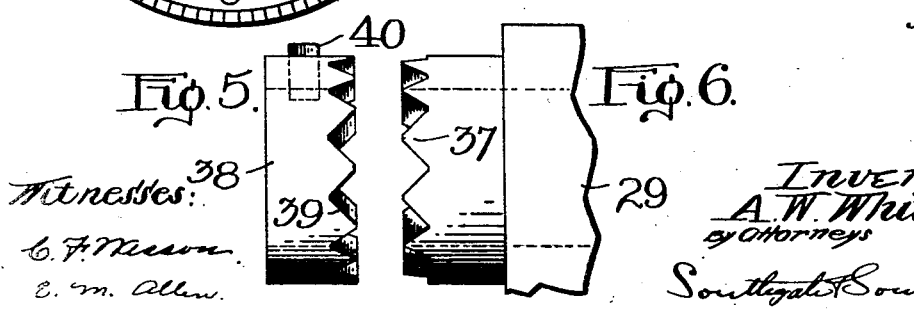
Witnesses:
C. F. Mason
E. M. Allen
Inventor:
A. W. Whitcomb
by Attorneys
Southgate & Southgate

UNITED STATES PATENT OFFICE.

ALONZO W. WHITCOMB, OF WORCESTER, MASSACHUSETTS, ASSIGNOR TO WHITCOMB-BLAISDELL MACHINE TOOL COMPANY, A CORPORATION OF MASSACHUSETTS.

DOUBLE-ACTING CLUTCH.

1,056,243.   Specification of Letters Patent.   Patented Mar. 18, 1913.

Application filed July 24, 1911. Serial No. 640,088.

*To all whom it may concern:*

Be it known that I, ALONZO W. WHITCOMB, a citizen of the United States, residing at Worcester, in the county of Worcester and State of Massachusetts, have invented a new and useful Double-Acting Clutch, of which the following is a specification.

The object of this invention is to provide a new and improved double acting clutch particularly of the electro-magnetic type.

To this end the invention consists of the parts and combinations of parts hereinafter described, and more particularly pointed out in the claims at the end of this specification.

The invention is illustrated in the accompanying two sheets of drawings; referring to which—

Figure 1 is a sectional elevation of my improved double acting clutch; Fig. 2 is an end elevation from the left-hand side shown in Fig. 2; Figs. 3 and 4 are end elevations of the adjusting ratchets; and Figs. 5 and 6 are side elevations of the saw-tooth thrust pieces hereinafter described.

Referring to the drawings and in detail A designates a driving shaft and B a driven shaft, the particular arrangement being such that power is to be transmitted from the shaft A to the shaft B when the clutch is in operation. Fastened to the shaft A is a friction clutch member C. This member consists of a hub 10 projecting from which are radial arms 11 which have segments 12 at their outer ends. The segments are separated from each other, as illustrated in Fig. 2, and their outer surfaces are formed on an incline, as illustrated in Fig. 1, so as to form a conical friction surface. The arms or spokes 11—11 are inclined or dish-shaped for a purpose hereinafter described. The hub 10 is secured to the shaft A by a pin 13.

D designates a disk armature which is threaded on to the hub 10.

E designates a hollow electro-magnet which is provided with a coil 14. The magnet is provided on its surface with a metallic ring 15 supported on an insulating ring 16. A spring-pressed plunger 17 is arranged to bear on the ring 15. One end of the coil is connected to the ring 15 and the other end to the magnet frame or core and thus to the ground. The plunger 17 is mounted in a plug 18, which is insulated from the rest of the mechanism, and one wire of the circuit is connected to this plug, and the other to the ground. By closing the circuit the electro-magnet is energized, or by opening the circuit the magnet is deenergized. The magnet is provided with an extending conical flange 19, which is shaped to coöperate with the segments 12 which forms a friction engaging surface. The magnet is normally kept away from the surface of the armature by means of bolts 20 which are housed in the armature and which have nuts 21 screwed on their ends engaging which are springs 22 housed around said bolts.

On the back of the armature is arranged a ratchet 24. Fitted on the hub of the armature is a ring 25 which has ratchet teeth 26 shaped to engage the ratchet teeth 24 of the armature. Plungers 27 have their ends threaded or fastened in the arms 11 of the friction clutch member C, and springs 28 are arranged around these plungers so as normally to force the ring 25 and its ratchet 26 into engagement with the ratchet 24 on the armature. The ratchets 24 and 26 and the screw-threads of the armature on the hub 10 are arranged so that this mechanism forms an automatic adjusting device for keeping the magnet in just the exact adjustment relative to the armature. When the magnet is energized it is pulled toward the armature and brings the friction surfaces into engagement. This engagement is very powerful, as the dish-shaped spokes 11—11 will provide a toggle action which will throw the segments 12—12 outwardly. If the face of the magnet engages the armature before there is sufficient engagement in the friction surfaces to lock the same, the friction of the armature on the magnet will turn the armature on the hub 10, so as to screw the armature up thereon, the ratchets permitting this movement. This will automatically bring the parts to adjustment, so that the normal operation will be such that the magnet will be attracted substantially into actual contact with the armature when the maximum clutching effect is attained. The ratchets prevent any backward movement of the armature on its hub. This adjustment will also be continued when there is any wear of the friction surfaces. The heads or nuts 23 on the bolts 20 tend to keep the ratchets in engagement when the magnet is free of the armature, but when the magnet is pulled toward the armature, the heads 23 lift from the ring 25 a slight distance so that the ratchet can act, as previously described, the plungers 27 and springs 28 then being the only means for holding the ratchets together.

The magnet E is slidably arranged on a hub 29 which is loosely journaled on the shaft A. Extending from this hub 29 is a flange 30 which forms a friction engaging surface F surrounding a friction clutch member G comprising segments 31, connected by arms 32 to a hub 33 which is secured by pin 34 to the shaft A. The construction of the conical friction 31, arms 32, and hub 33 preferably is substantially the same as the parts 10, 11 and 12, and the two friction clutch members C and G are opposed or oppositely arranged relatively to each other.

A gear 35 is keyed to the hub 29 and meshes with a gear 36 keyed to the shaft B. The end of the hub 29 is formed with saw-teeth 37 to form a thrust piece, as illustrated in Fig. 6. Loosely fitting on the shaft A is a hub or thrust piece 38 which has saw-teeth 39 shaped to engage the saw-teeth 37. The saw-teeth 37 and 39 are arranged annularly, as illustrated in Figs. 5 and 6. The hub 38 is provided with a pin 40 which fits into a slot 41 extending partially across the hole in the magnet E. The pin 40 also fits in a groove 400 cut in the shaft A so as to limit the right hand movement of the electro-magnet.

In operation when the magnet is energized, the same moves toward the armature and engages the friction surfaces of the friction clutch member G and the friction engaging surface 19. This causes the magnet E to rotate with the shaft A. As the magnet rotates it bears on the pin 40 and turns the thrust piece 38. This, through the saw-teeth 37 and 39 tends to turn the hub 29 and to force the same to the right. As the hub 29 is turned, the gear 35 is turned, and when the gear 35 encounters the resistance of the gear 36 on the driven shaft B, the engagement between the two sets of saw-teeth will force the friction engaging surface F to the right into tight engagement with the friction clutch member G, and these friction surfaces additionally will lock and thus a double clutching effect will be obtained. When the electro-magnet is deënergized, the same will be allowed to move to the right, by means of springs 22, and the friction engaging surfaces on both sides will be released.

To provide against sticking of the right-hand friction engaging surface F, arms 42 are secured to the gear 35, which arms are connected by springs 43 to pins 44 secured in the magnet, the function and purpose of these arms and springs being to pull the friction engaging surface F to the left when the electro-magnet is deënergized and thus insure the unlocking of the right-hand clutching surfaces. Thus a double acting magnetic clutch of the electro-magnetic variety is provided.

The details and arrangements herein shown and described may be greatly varied by a skilled mechanic without departing from the scope of my invention as expressed in the claims.

Having thus fully described my invention, what I claim and desire to secure by Letters-Patent is:—

1. In a clutch, the combination of a driving shaft, a friction clutch member secured on the shaft, an armature connected to the friction clutch member, means whereby the armature will be automatically adjusted relatively to the friction clutch member, an electro-magnet loosely mounted on the shaft and having a friction surface for engaging the friction clutch member, and means for transmitting power from the magnet when it is energized.

2. In a clutch, the combination of a driving shaft, two opposed friction clutch members secured on the shaft, two friction engaging surfaces for engaging the friction clutch members, means for engaging and disengaging one friction surface with its clutch member, and thrust pieces arranged between said friction surfaces, whereby when one friction surface is engaged it will force the other friction surface into engagement.

3. In a clutch, the combination of a driving shaft, two opposed friction clutch members secured on the shaft, two friction surfaces for engaging the friction clutch members, means for engaging and disengaging one friction surface with its clutch member, and thrust pieces having engaging saw-teeth arranged between said friction surfaces, whereby when one friction surface is engaged, it will force the other friction surface into engagement.

4. In a clutch, the combination of a driving shaft, two opposed friction clutch members secured on the shaft, two friction surfaces for engaging the friction clutch members, means for engaging and disengaging one friction surface with its clutch member, thrust pieces arranged between said friction surfaces, whereby when one friction surface is engaged it will force the second friction surface into engagement, and springs for disengaging the second friction surface when the first friction surface is disengaged.

5. In a clutch, the combination of a driving shaft, two opposed friction clutch members secured on the shaft, an electro-magnet loosely mounted on the shaft and carrying a friction surface for engaging with one clutch member, a second friction surface for engaging with the other friction clutch member, and thrust pieces arranged between said friction surfaces, whereby when the magnet is energized, one friction surface will engage its clutch member and the thrust pieces will force the other friction surface into engagement with its clutch member.

6. In a clutch, the combination of a driving shaft, two opposed friction clutch members secured on the shaft, an electro-magnet having a friction engaging surface for engaging one of the clutch members, an armature carried by said clutch member, the electro-magnet being slidably arranged on the hub of the other friction engaging surface, a gear on this hub for transmitting power, the end of the hub being formed with notched teeth, a thrust collar having notched teeth arranged between one friction clutch member and the hub of the other friction engaging surface, and a sliding connection between said electro-magnet and said thrust collar.

In testimony whereof 1 have hereunto set my hand, in the presence of two subscribing witnesses.

ALONZO W. WHITCOMB.

Witnesses:
J. ELMER HALL,
E. M. ALLEN.